(12) United States Patent
Gormley (10) Patent No.: US 9,976,696 B2
(45) Date of Patent: May 22, 2018

(54) LINEAR ACTUATOR WITH MULTI-DEGREE OF FREEDOM MOUNTING STRUCTURE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 0 days. days.

(21) Appl. No.: 15/188,565

(22) Filed: Jun. 21, 2016

(65) Prior Publication Data
US 2017/0363250 A1 Dec. 21, 2017

(51) Int. Cl.
| | |
|---|---|
| *F01D 15/12* | (2006.01) |
| *F16M 13/02* | (2006.01) |
| *F16H 25/20* | (2006.01) |
| *F02K 1/72* | (2006.01) |

(52) U.S. Cl.
CPC ............ *F16M 13/02* (2013.01); *F02K 1/72* (2013.01); *F16H 25/20* (2013.01); *F16H 2025/2037* (2013.01)

(58) Field of Classification Search
CPC F02K 1/763; F02K 1/72; F16M 13/02; F16H 25/20
USPC .................... 74/594; 248/316.1; 415/122.1
See application file for complete search history.

(56) References Cited

U.S. PATENT DOCUMENTS

| | | | |
|---|---|---|---|
| 2,943,443 A | 7/1960 | Voymas et al. | |
| 3,024,605 A | 3/1962 | Nash et al. | |
| 3,497,165 A | 2/1970 | Sutton et al. | |
| 3,500,646 A | 3/1970 | Hom et al. | |
| 3,511,055 A | 5/1970 | Timms et al. | |
| 3,587,973 A | 6/1971 | Wolf et al. | |
| 3,600,894 A | 8/1971 | Mcclain et al. | |
| 3,612,209 A | 10/1971 | Vdoviak et al. | |
| 3,621,763 A | 11/1971 | Geyer et al. | |
| 3,829,020 A | 8/1974 | Stearns | |
| 4,278,220 A | 7/1981 | Johnston et al. | |
| 4,465,392 A * | 8/1984 | Lang ............. | F16C 7/026 156/60 |
| 4,519,561 A | 5/1985 | Timms | |
| 4,564,160 A | 1/1986 | Vermilye | |
| 4,567,786 A | 2/1986 | Sakurai | |

(Continued)

FOREIGN PATENT DOCUMENTS

| | | |
|---|---|---|
| DE | 10124843 A1 | 11/2002 |
| DE | 102011008918 A1 | 7/2012 |

(Continued)

OTHER PUBLICATIONS

SKYbrary, "Cascade Reverser", from SKYbrary Wiki, Dec. 9, 2013.

(Continued)

*Primary Examiner* — Todd M Epps
(74) *Attorney, Agent, or Firm* — O'Shea Getz P.C.

(57) ABSTRACT

An actuation system includes a linear actuator extends longitudinally along an actuation axis. A first link extends along a first centerline parallel to the actuation axis, where first link is on a first side of the linear actuator. A second link extends along a second centerline parallel to the actuation axis, where the second link is on a second side of the linear actuator. The first and the second links are configured to transfer a load along the first and the second centerlines between the component and the linear actuator.

20 Claims, 8 Drawing Sheets

(56) References Cited

U.S. PATENT DOCUMENTS

| | | | |
|---|---|---|---|
| 4,688,446 A * | 8/1987 | Ishikawa | F16C 9/04 |
| | | | 123/197.4 |
| 4,807,434 A | 2/1989 | Jurich | |
| 4,909,442 A | 3/1990 | Fernz | |
| 5,117,630 A | 6/1992 | Cariola et al. | |
| 5,228,641 A | 7/1993 | Remlaoui | |
| 5,255,850 A | 10/1993 | Cockerham | |
| 5,309,711 A | 5/1994 | Matthias | |
| 5,476,237 A | 12/1995 | Clarke | |
| 5,609,020 A | 3/1997 | Jackson et al. | |
| 5,778,659 A | 7/1998 | Duesler et al. | |
| 5,927,647 A | 7/1999 | Masters et al. | |
| 5,987,880 A | 11/1999 | Culbertson | |
| 6,036,238 A | 3/2000 | Lallament | |
| 6,042,053 A | 3/2000 | Sternberger et al. | |
| 6,167,694 B1 | 1/2001 | Davies | |
| 6,170,254 B1 | 1/2001 | Cariola | |
| 6,293,495 B1 | 9/2001 | Aten et al. | |
| 6,340,135 B1 | 1/2002 | Barton | |
| 6,487,846 B1 | 12/2002 | Chakkera et al. | |
| 6,584,763 B2 | 7/2003 | Lymons et al. | |
| 6,845,946 B2 | 1/2005 | Lair | |
| 6,895,742 B2 | 5/2005 | Lair et al. | |
| 7,104,500 B1 | 9/2006 | Smith | |
| 7,146,796 B2 | 12/2006 | Lair | |
| 7,264,203 B2 | 9/2007 | Lair | |
| 7,513,101 B2 | 4/2009 | Eschborn et al. | |
| 7,735,778 B2 | 6/2010 | Lair et al. | |
| 7,874,142 B2 | 1/2011 | Beardsley | |
| 8,002,217 B2 | 8/2011 | Sternberger | |
| 8,109,466 B2 | 2/2012 | Aten et al. | |
| 8,109,468 B2 | 2/2012 | Andre et al. | |
| 8,172,175 B2 | 5/2012 | Lair | |
| 8,464,512 B2 | 6/2013 | Vauchel et al. | |
| 8,615,982 B2 | 12/2013 | Sundstrom et al. | |
| 8,793,973 B2 | 8/2014 | Vauchel | |
| 8,904,751 B2 | 12/2014 | Howarth et al. | |
| 8,931,253 B2 | 1/2015 | Baudu et al. | |
| 8,943,794 B2 | 2/2015 | Moradell-Casellas et al. | |
| 9,062,612 B2 * | 6/2015 | Rodrigues | F02K 1/72 |
| 9,086,035 B2 | 7/2015 | Jones | |
| 9,181,898 B2 | 11/2015 | Bhatt | |
| 9,260,194 B2 | 2/2016 | Francisco et al. | |
| 9,303,590 B2 | 4/2016 | West et al. | |
| 2004/0068978 A1 | 4/2004 | Lair et al. | |
| 2005/0039438 A1 | 2/2005 | Lair | |
| 2005/0151012 A1 | 7/2005 | Lair | |
| 2006/0288688 A1 | 12/2006 | Lair | |
| 2009/0193789 A1 | 8/2009 | Pero | |
| 2009/0321561 A1 | 12/2009 | Andre et al. | |
| 2010/0139242 A1 | 6/2010 | Vauchel et al. | |
| 2010/0192715 A1 | 8/2010 | Vauchel et al. | |
| 2010/0270428 A1 | 10/2010 | Murphy | |
| 2011/0062279 A1 | 3/2011 | Welch et al. | |
| 2011/0167790 A1 | 7/2011 | Cloft et al. | |
| 2012/0067975 A1 | 3/2012 | Vauchel | |
| 2012/0187214 A1 | 7/2012 | Welch et al. | |
| 2012/0193448 A1 | 8/2012 | Caruel | |
| 2012/0304621 A1 | 12/2012 | Stuart et al. | |
| 2013/0075492 A1 | 3/2013 | Welch et al. | |
| 2013/0160425 A1 | 6/2013 | Scanlon et al. | |
| 2013/0160604 A1 * | 6/2013 | McNeil | F16C 23/045 |
| | | | 74/594 |
| 2013/0186219 A1 | 7/2013 | Jones | |
| 2013/0284822 A1 | 10/2013 | Howarth et al. | |
| 2013/0294893 A1 * | 11/2013 | Rodrigues | F02K 1/72 |
| | | | 415/122.1 |
| 2013/0312387 A1 | 11/2013 | West et al. | |
| 2014/0150403 A1 | 6/2014 | Stuart et al. | |
| 2014/0245743 A1 | 9/2014 | Caruel et al. | |
| 2015/0052875 A1 | 2/2015 | Lohman | |
| 2015/0259063 A1 | 9/2015 | Osvog | |
| 2015/0267640 A1 | 9/2015 | Gormley | |
| 2015/0308380 A1 | 10/2015 | Biset | |
| 2015/0354500 A1 | 12/2015 | Caruel | |

FOREIGN PATENT DOCUMENTS

| | | |
|---|---|---|
| EP | 0801221 A2 | 10/1997 |
| EP | 0926333 A1 | 6/1999 |
| WO | WO2011073558 A1 | 6/2011 |

OTHER PUBLICATIONS

Mohd Siddiqui, "Review of Thrust Reverser Mechanism Used in Turbofan Jet Engine Aircraft", International Journal of Engineering Research and Technology, ISSN 0974-3154 vol. 6, No. 5, International Research Publication House, 2013, pp. 717-726.

EP search report for EP17176360.0 dated Mar. 1, 2018.

* cited by examiner

LINEAR ACTUATOR WITH MULTI-DEGREE OF FREEDOM MOUNTING STRUCTURE

BACKGROUND OF THE INVENTION

1. Technical Field

This disclosure relates generally to a mounting structure and, more particularly, to a multi-degree of freedom mounting structure.

2. Background Information

Various types of linear actuators and mounting schemes for such linear actuators are known in the art. While known mounting schemes have certain benefits, there is still room in the art for improvement.

SUMMARY OF THE DISCLOSURE

According to an aspect of the present disclosure, an actuation system is provided that includes a component, a linear actuator, a first link and a second link. The linear actuator extends longitudinally along an actuation axis. The first link extends along a first centerline parallel to the actuation axis. The first link is disposed on a first side of the linear actuator. The second link extends along a second centerline parallel to the actuation axis. The second link is disposed on a second side of the linear actuator laterally opposite the first side. The first and the second links are configured to transfer a load along the first and the second centerlines between the component and the linear actuator.

According to another aspect of the present disclosure, another actuation system is provided that includes a translatable component, a linear actuator, an actuator mount, a first link and a second link. The translatable component includes a first mount and a second mount. The linear actuator extends longitudinally along an actuation axis. The actuator mount is coupled to the linear actuator. The first link is on a first side of the linear actuator. The first link is coupled to the actuator mount through a first spherical bearing. The first link is coupled to the first mount through a second spherical bearing. The second link is on a second side of the linear actuator laterally opposite the first side. The second link is coupled to the actuator mount through a third spherical bearing. The second link is coupled to the second mount through a fourth spherical bearing.

According to still another aspect of the present disclosure, another actuation system is provided that includes a translatable component, a linear actuator, an actuator mount, a first link and a second link. The translatable component includes a first mount and a second mount. The linear actuator extends longitudinally along an actuation axis. The actuator mount is pivotally coupled to the linear actuator about a first pivot axis perpendicular to the actuation axis. The first link is on a first side of the linear actuator. The first link is between and interconnects the actuator mount and the first mount. The first link is pivotally coupled to the actuator mount about a second pivot axis parallel with the first pivot axis. The second link is on a second side of the linear actuator laterally opposite the second side. The second link is between and interconnects the actuator mount and the second mount. The second link is pivotally coupled to the actuator mount about a third pivot axis parallel with the first pivot axis.

A first straight-line trajectory may extend through a centroid of the first spherical bearing and a centroid of the second spherical bearing, and is parallel to the actuation axis. A second straight-line trajectory may extend through a centroid of the third spherical bearing and a centroid of the fourth spherical bearing, and may be parallel to the actuation axis.

The first link may be pivotally coupled to the first mount about a fourth pivot axis perpendicular to the first pivot axis and the actuation axis. The second link may be pivotally coupled to the second mount about a fifth pivot axis co-axial with the fourth pivot axis.

The first link may include a first spherical bearing and a second spherical bearing. The first link may extend along the first centerline between the first spherical bearing and the second spherical bearing.

A pair of mounting tabs may project out from the component. The first spherical bearing may be laterally between and attached to the mounting tabs.

An actuator mount may be pivotally attached to the linear actuator. The actuator mount may include a pair of mounting tabs. The second spherical bearing may be laterally between and attached to the mounting tabs.

A pair of second mounting tabs may project out from the component. The first spherical bearing may be laterally between and attached to the second mounting tabs.

The first spherical bearing may have a first axis. The second spherical bearing may have a second axis. The first axis may be perpendicular to the second axis.

The first axis and the second axis may be perpendicular to the actuation axis.

An actuator mount may include a mount base, a first mount and a second mount. The mount base may extend circumferentially about and may be pivotally coupled to the linear actuator. The first mount may be on the first side and project radially out from the mount base. The second mount may be on the second side and project radially out from the mount base. A first spherical bearing may couple the first mount with the first link. A second spherical bearing may couple the second mount with the second link.

A third mount may be connected to the component. A fourth mount may be connected to the component. A third spherical bearing may couple the third mount with the first link. A fourth spherical bearing may couple the fourth mount with the second link.

The first centerline may extend through a centroid of the first spherical bearing and a centroid of the third spherical bearing.

The mount base may be pivotally coupled to the linear actuator about a pivot axis perpendicular to the actuation axis.

A first mount may be connected to the component. A second mount may be connected to the component. A first spherical bearing may couple the first mount with the first link. A second spherical bearing may couple the second mount with the second link.

A second component may be included. The linear actuator may include an actuator base and a translatable element. The linear actuator may be configured to move the translatable element relative to the actuator base. The actuator base may be coupled to the second component. The translatable element may be coupled to the component through the first and the second links.

A third component may be included. The second component may be disposed axially between the component and the third component along the actuation axis. The linear actuator may include a second translatable element. The linear actuator may be configured to move the second translatable element relative to the actuator base. The second translatable element may be coupled to the third component.

The component may be configured as a component of a nacelle system.

The foregoing features and the operation of the invention will become more apparent in light of the following description and the accompanying drawings.

DETAILED DESCRIPTION OF THE INVENTION

Figure 1:
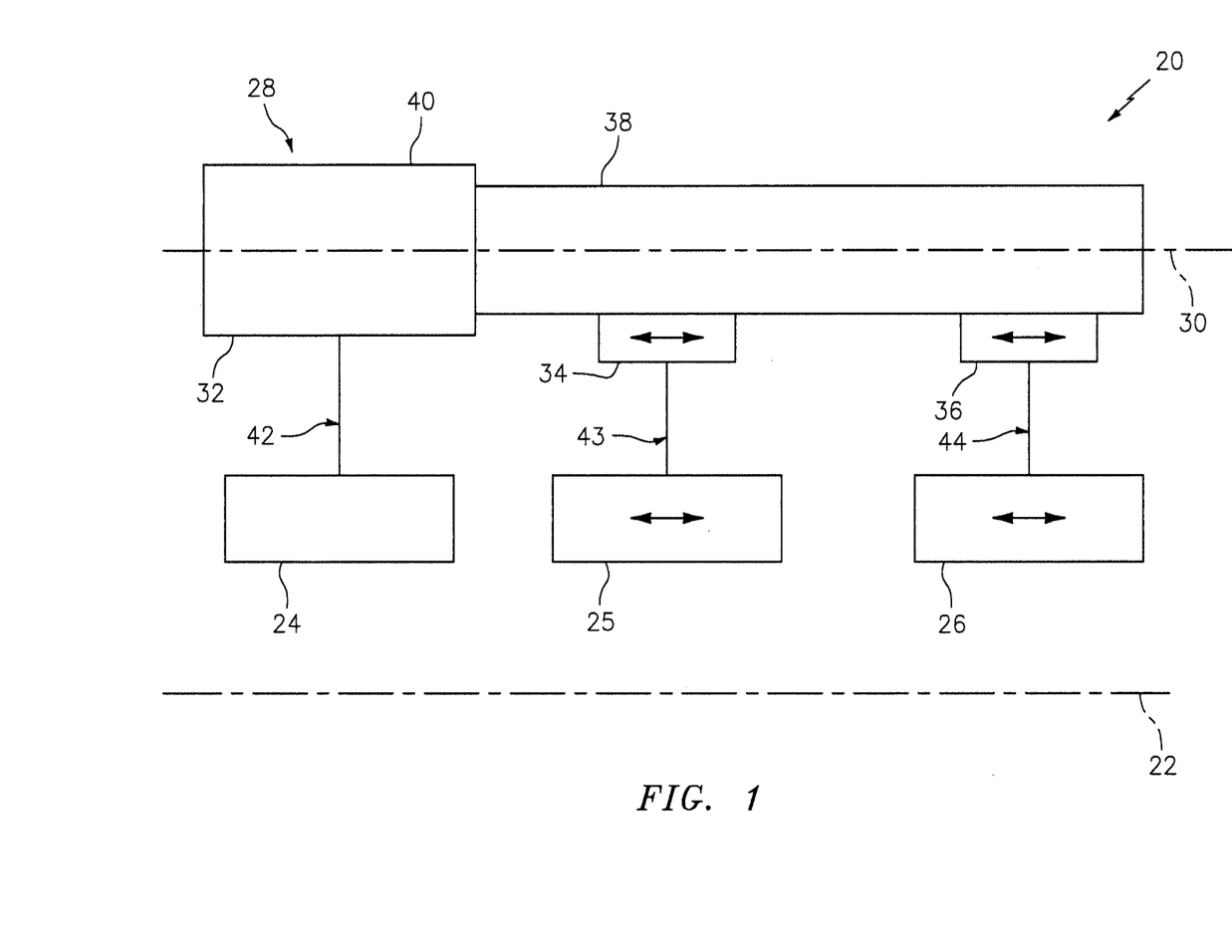
FIG. 1 is a schematic illustration an actuation system.

FIG. 1 is a schematic illustration an actuation system 20 with an actuation system centerline 22. This actuation system 20 includes a plurality of components 24-26 disposed along the actuation system centerline 22. The actuation system 20 also includes a linear actuator 28; e.g., a dual lead screw actuator.

The components may include a stationary (e.g., axially forward) component 24, a first translatable (e.g., axially intermediate) component 25 and a second translatable (e.g., axially aft) component 26. These components 24-26 may be configured as components of a turbofan turbine engine aircraft propulsion system. For example, the stationary component 24 may be configured as a torque box for a thrust reverser system, or any other stationary component of a forward nacelle structure. The translatable components 25 and 26 may be configured as aft translatable components of the thrust reverser system. Examples of such translatable components include, but are not limited to, a translating sleeve, a translating cascade and a translating support structure (e.g., a blocker door carriage). One of the translatable components may alternatively be configured as another type of aft translatable component; e.g., a translating nozzle for a variable area fan nozzle (VAFN). Other examples of stationary and translatable components are disclosed in U.S. application Ser. No. 14/968,357 which is hereby incorporated herein by reference in its entirety. The components of the present disclosure, however, are not limited to the foregoing exemplary configurations. Furthermore, the actuation system 20 of the present disclosure is not limited to aircraft propulsion system applications.

The linear actuator 28 extends longitudinally along an actuation axis 30, which is substantially parallel to the actuation system centerline 22. This linear actuator 28 is configured to translate the first translatable component 25 axially along the actuation system centerline 22. The linear actuator 28 is also configured to translate the second translatable component 26 axially along the actuation system centerline 22.

The linear actuator 28 includes a stationary actuator base 32, a first translatable element 34 (e.g., a carriage) and a second translatable element 36 (e.g., a carriage, or rod end), which elements are disposed along the actuation axis 30. The actuator base 32 is mounted to the stationary component 24. The first translatable element 34 is mounted to the first translatable component 25. The second translatable element 36 is mounted to the second translatable component 26.

The linear actuator 28 also includes a drive mechanism 38 (e.g., a dual lead screw, a dual piston, etc.) and an actuation device 40; e.g., a motor. The actuation device 40 may be configured as an electric motor, a hydraulic actuation device, a pneumatic actuation device, or any other type of actuation device. The actuation device 40 is configured to drive each of the translatable elements 34 and 36 (at the same or different speeds) along the actuation axis 30 through the drive mechanism 38. An example of such a linear actuator is disclosed in the U.S. application Ser. No. 14/968,357 referenced above. The actuation system 20 of the present disclosure, however, is not limited to such an exemplary drive mechanism or linear actuator.

Figure 2:
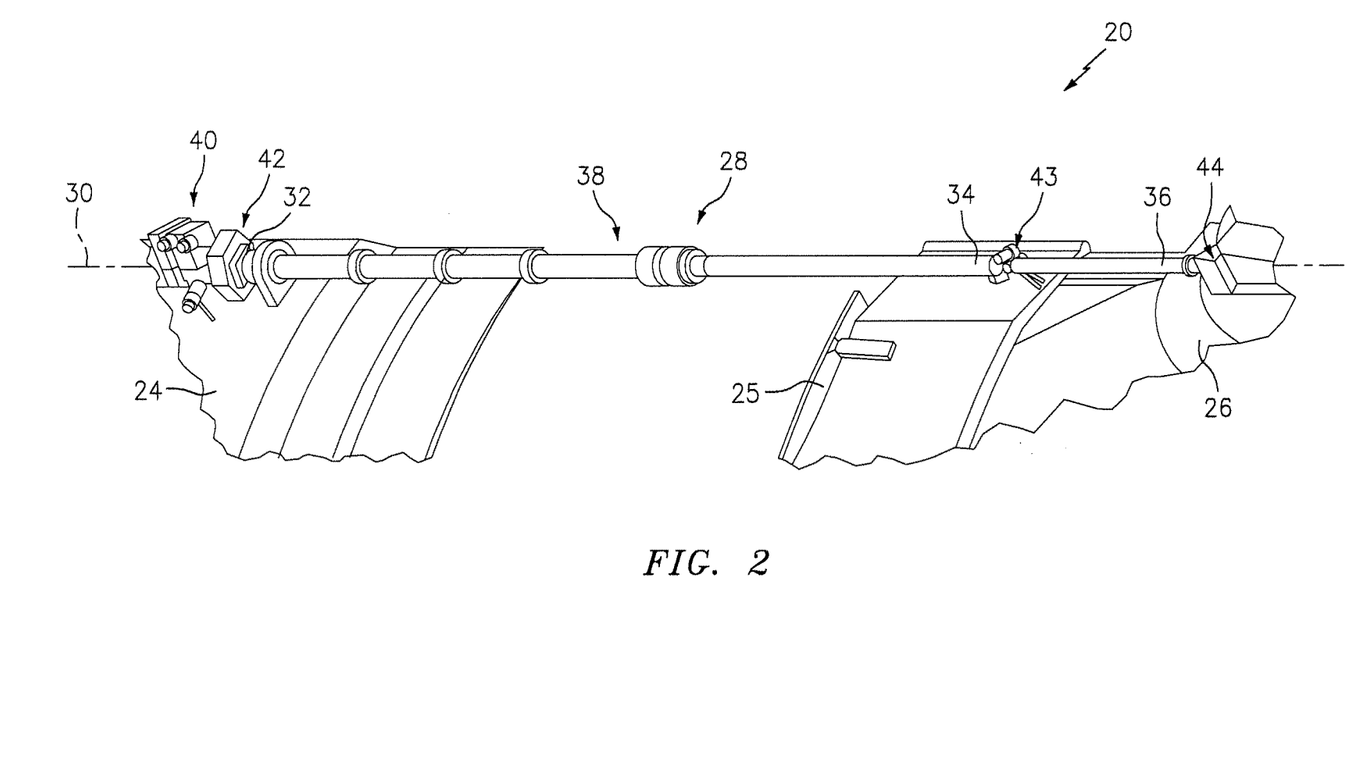
FIG. 2 is a perspective illustration of the actuation system.
Figure 3:
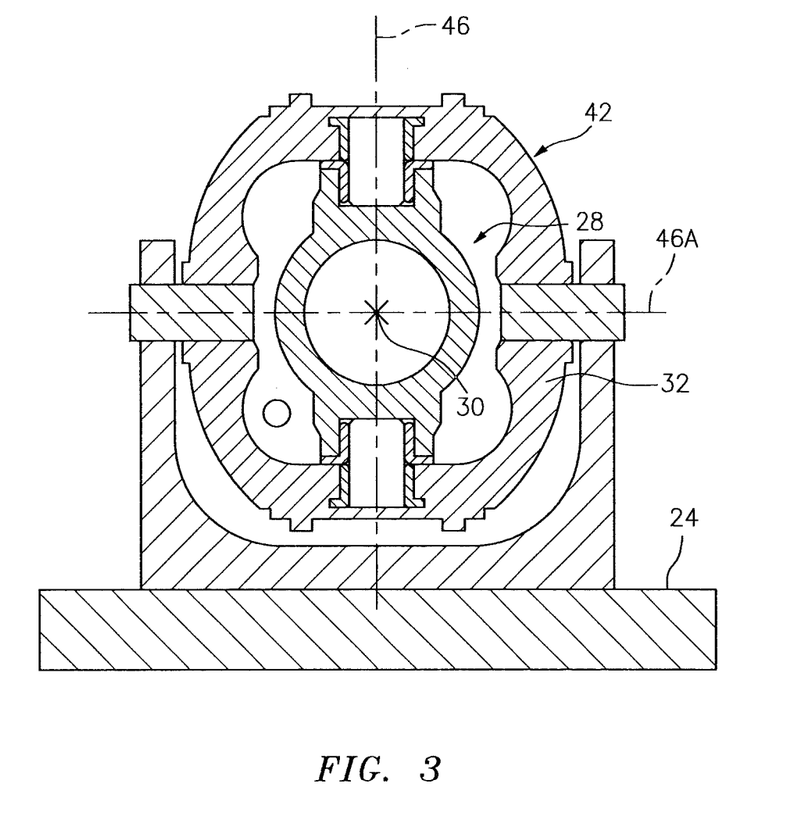
FIG. 3 is a diagrammatic illustration of a mounting structure interconnecting two components.

Referring to FIG. 2, the elements 32, 34 and 36 of the linear actuator 28 are mounted to the components 24-26 through respective mounting structures 42-44. Referring to FIG. 3, the first mounting structure 42 may be configured as a gimbal joint. This gimbal joint configuration enables the actuator base 32 to pivot relative to the stationary component 24 about a pivot axis 46 and a pivot axis 46A. The pivot axis 46 is substantially perpendicular to the actuation axis 30. The pivot axis 46 may also be coincident with (e.g., cross-through) the actuation axis 30 and the actuation system centerline 22 (see FIG. 1). The present disclosure, however, is not limited to such an exemplary first mounting structure configuration.

Figure 4:
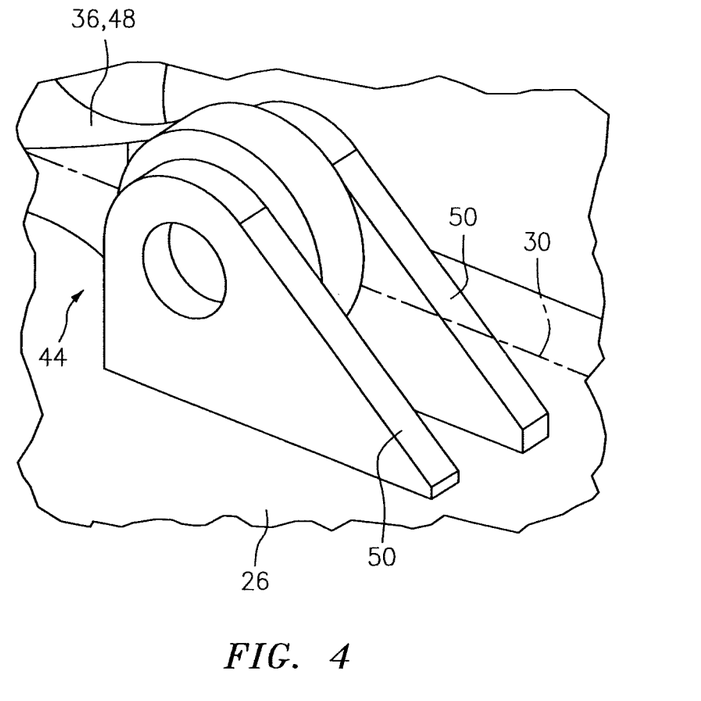
FIG. 4 is a perspective illustration of another mounting structure interconnecting two components.

Referring to FIG. 4, the third mounting structure 44 may be configured as a spherical bearing joint. The third mounting structure 44, for example, may include a rod end 48 with a spherical bearing and a pair of mounting tabs 50, which are connect to (e.g., formed integral with or otherwise attached to) and project out from the second translatable component 26. The spherical bearing is disposed between and mechanically fastened to the mounting tabs 50. The spherical bearing enables the second translatable element 36 to pivot about a centroid of the bearing in two orthogonal directions. The present disclosure, however, is not limited to such an exemplary third mounting structure configuration.

Figure 5:
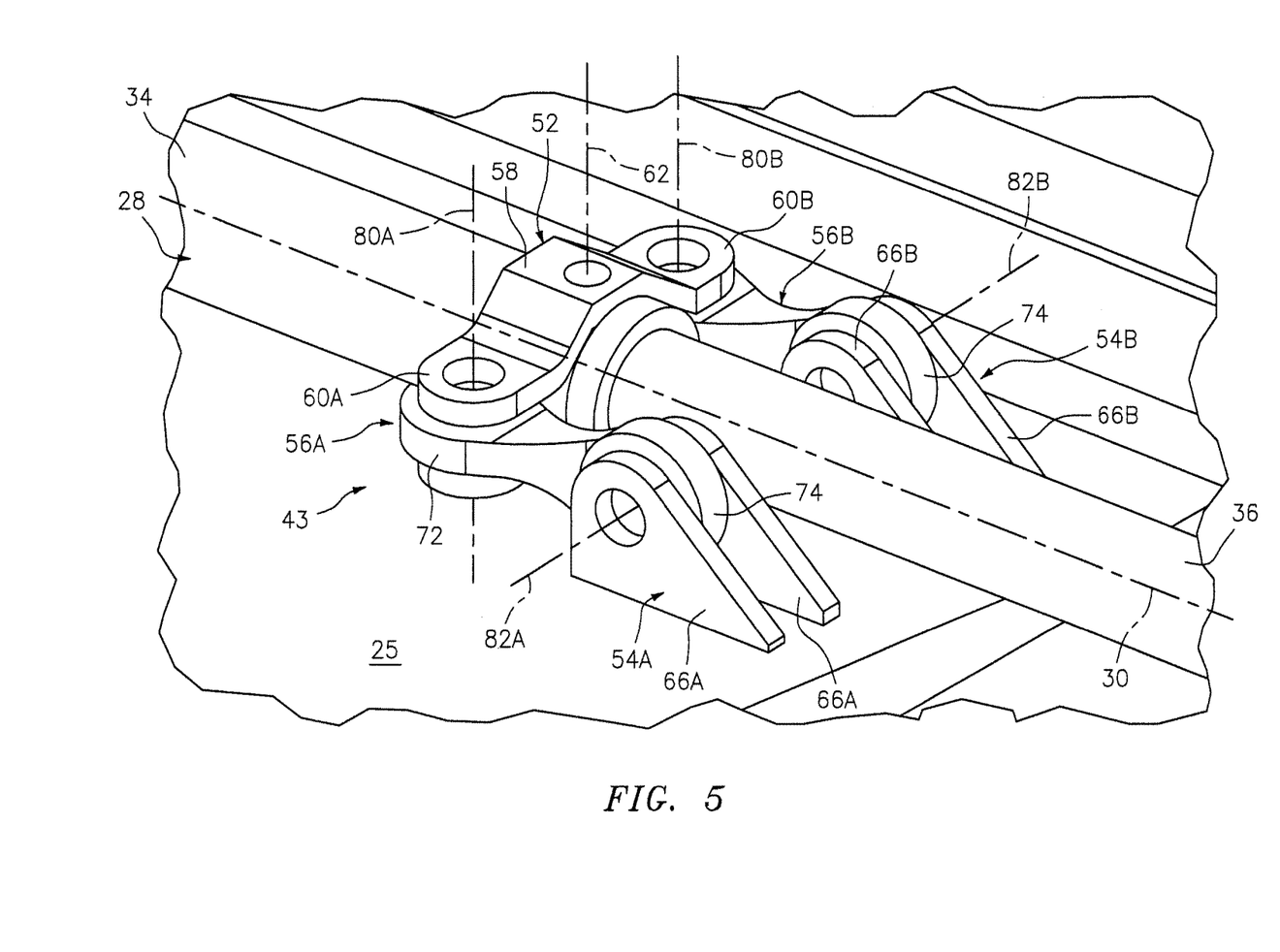
FIG. 5 is a perspective illustration of a five degree-of-freedom mounting structure interconnecting two components.

Referring now to FIG. 5, the second mounting structure 43 may be configured as a five degree-of-freedom (5 DoF) joint. This 5 DoF joint configuration may enable at least slight movement of the first translatable element 34 relative to the first translatable component 25 in all but an axial (relative to the actuation axis 30) direction. The second mounting structure 43 includes an actuator mount 52, a pair of link mounts 54A and 54B, and a pair of links 56A and 56B (e.g., struts).

Figure 6:
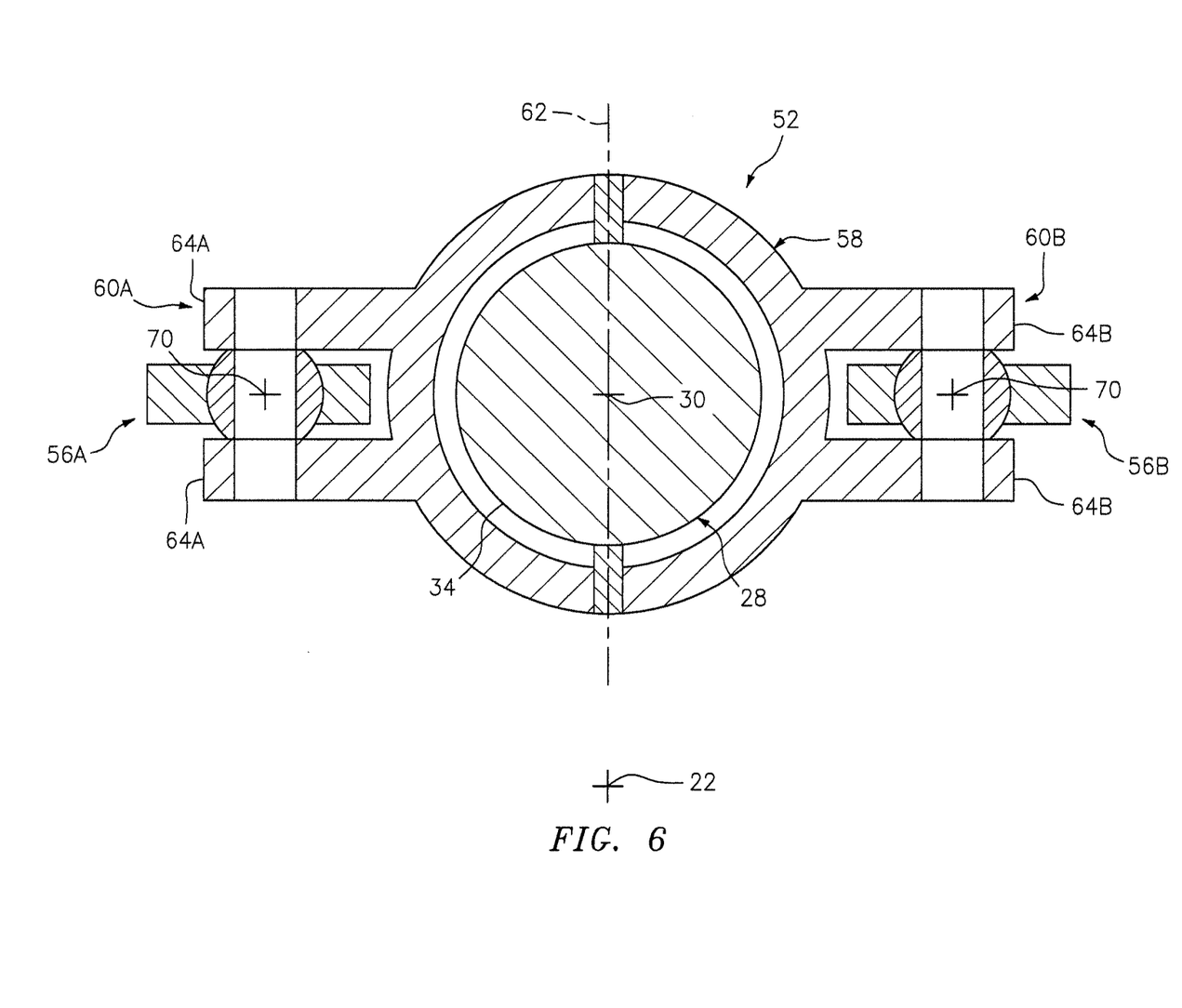
FIG. 6 is a cross-sectional, diagrammatic illustration of the five degree-of-freedom mounting structure.

Referring to FIGS. 5 and 6, the actuator mount 52 includes a mount base 58 and a pair of link mounts 60A and 60B. The mount base 58 may have a generally tubular body, which extends circumferentially completely (or partially) around the first translatable element 34 and the actuation axis 30. This mount base 58 is configured as a gimbal joint, and is pivotally connected to the first translatable element 34 about a pivot axis 62. The pivot axis 62 is substantially perpendicular to the actuation axis 30. The pivot axis 62 may also be coincident with (e.g., cross-through) the actuation axis 30 and the actuation system centerline 22 (see FIG. 6).

Referring to FIG. 6, each of the link mounts 60A, 60B may include a pair of parallel mounting tabs 64A, 64B. The first pair of mounting tabs 64A are disposed on a lateral first side of the linear actuator 28. These mounting tabs 64A project laterally out from the mount base 58. The second pair of mounting tabs 64B are disposed on a lateral second side of the linear actuator 28, which second side is laterally opposite the first side. The mounting tabs 64B project laterally out from the mount base 58.

Referring to FIG. 5, each of the link mounts 54A, 54B may include a pair of parallel mounting tabs 66A, 66B. This first pair of mounting tabs 66A are disposed on the first side of the linear actuator 28. These mounting tabs 66A project out from and are connected to the first translatable component 25. The second pair of mounting tabs 66B are disposed on the second side of the linear actuator 28. These mounting tabs 66B project laterally out from and are connected to the first translatable component 25.

Figure 7:
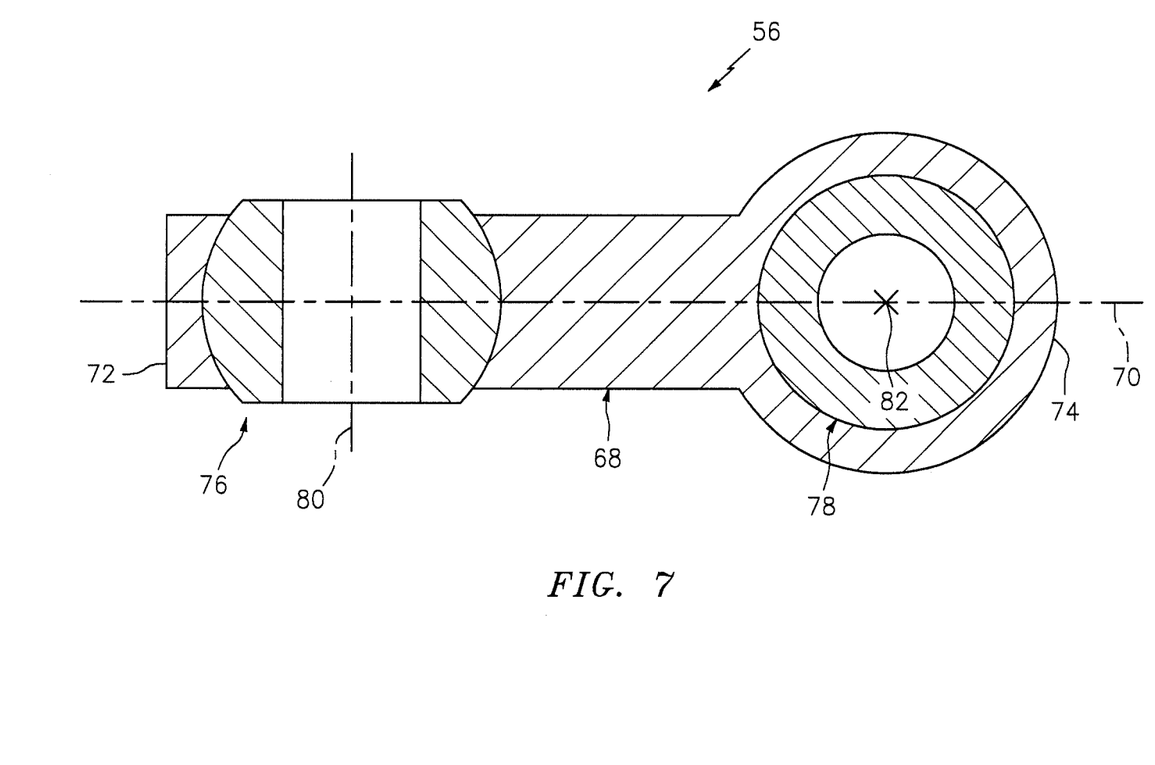
FIG. 7 is a side sectional, diagrammatic illustration of a link for the five degree-of-freedom mounting structure.

The first link 56A is disposed on the first side of the linear actuator 28. The second link 56B is disposed on the second side of the linear actuator 28. The first link 56A and the second link 56B may have substantially identical configurations. Each link 56 of FIGS. 5 and 7, for example, includes a unitary structural member 68 that extends along a centerline 70 between opposing link ends 72 and 74. Each link 56 also includes a pair of spherical bearings 76 and 78. The centerline 70 of the structural member 68 may have a straight-line trajectory that extends through centroids of the spherical bearings 76 and 78, where the centerline 70 is substantially parallel to the actuation axis 30.

The first spherical bearing 76 is arranged with the structural member 68 at the first link end 72. The first spherical bearing 76 is disposed between and mechanically fastened to a respective pair of the mounting tabs 64A, 64B and its mount 60A, 60B; see also FIG. 6. This first spherical bearing 76 has an axis 80A, 80B (e.g., a central bore/pivot axis), which extends through its centroid. This axis 80 is substantially perpendicular to the actuation axis 30 and substantially parallel to the pivot axis 62. The axes 80 of the pair of links 56 are also parallel with one another.

The second spherical bearing 78 is arranged with the structural member 68 at the second link end 74. The second spherical bearing 78 is disposed between and mechanically fastened to a respective pair of the mounting tabs 66A, 66B. This second spherical bearing 78 has an axis 82A, 82B (e.g., a central bore/pivot axis), which extends through its centroid. This axis 82 is substantially perpendicular to the actuation axis 30 and to the axes 80 and 62 and 30. The axes 82 of the pair of links 56 are also parallel with one another and, here, also co-axial with one another.

During operation of the actuation system 20 of FIG. 1, the components 24-26 may shift relative to one another, where this shifting represents movement different from the axial translation of the components 25 and 26. For example, this shifting may be in the faun of slight rotation about the actuation system centerline 22. This shifting may be also or alternatively be in the form of slight radial movement relative to the actuation system centerline 22. This can lead to the linear actuator 28 and its actuation axis 30 being slightly skewed from the actuation system centerline 22. The second mounting structure 43 of FIG. 5 is operable to accommodate such a skewed orientation without imparting a lateral load onto the linear actuator 28; e.g., particularly where the components 25 and 26 move slightly in opposite circumferential/radial directions. For example, as a result of the 5 DoF, the second mounting structure 43 is operable to allow slight misalignment between the first translatable component 25 and the first translatable element 34 while also significantly reducing or substantially eliminating transmission of non-axial (e.g., lateral, radial, etc.) loads between the elements 25 and 34. As a result, the second mounting structure 43 may be operable to substantially only transmits axial loads between the first translatable element 34 and the first translatable component 25; e.g., along the centerlines 70 (see FIG. 7).

Figure 8:
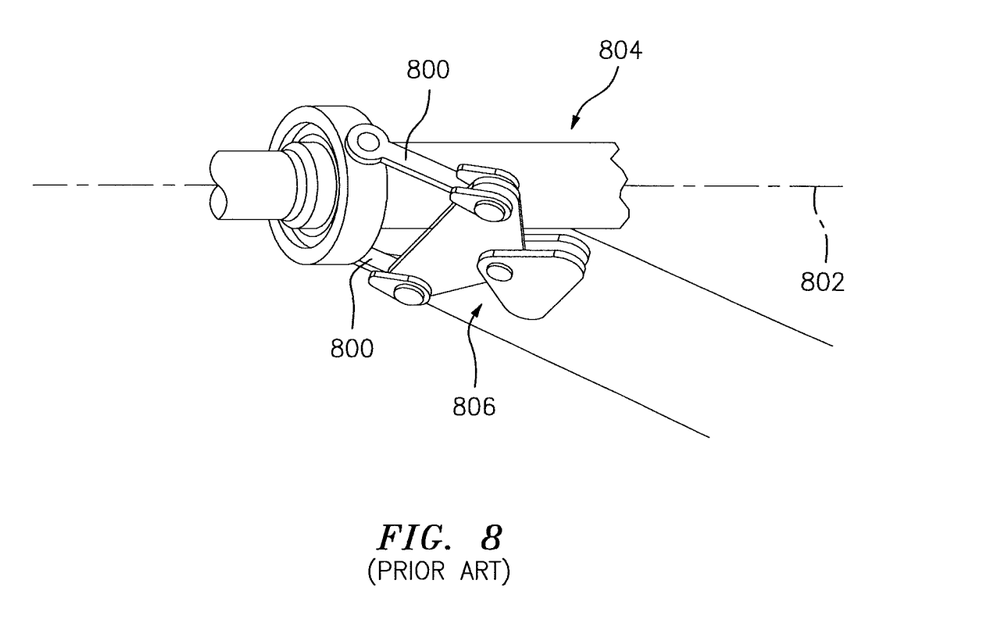
FIG. 8 is a perspective illustration of a prior art mounting structure.

The afore-described operability of the second mounting structure 43 is enabled by, among other things, the link centerlines 70 being substantially parallel to the actuation axis 30. In contrast, where links 800 are non-parallel to an actuation axis 802 as shown in FIG. 8, these links 800 transmit a radial load between components 804 and 806.

The actuation system 20 of the present disclosure may have different configurations than that described above. For example, one of the components 25 or 26 may be omitted, and the mounting structure 43 may be used to mount the linear actuator 28 to the remaining one of the components 25, 26. In another example, one or more of the spherical bearings 76 and/or 78 may each be configured with a respective one of the mounts 54, 60, and mechanically fastened to the link 56; e.g., the coupling arrangement between the mounts and the links may be reversed. The present disclosure therefore is not limited to the exemplary embodiments described above and illustrated in the drawings.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An actuation system, comprising:
a component;
a linear actuator extending longitudinally along an actuation axis;
a first link extending along a first centerline parallel to the actuation axis, the first link disposed on a first side of the linear actuator;
a second link extending along a second centerline parallel to the actuation axis, the second link disposed on a second side of the linear actuator laterally opposite the first side;
the first and the second links configured to transfer a load along the first and the second centerlines between the component and the linear actuator; and
a second component;
the linear actuator including an actuator base and a translatable element, the linear actuator configured to move the translatable element relative to the actuator base;
the actuator base coupled to the second component; and
the translatable element coupled to the component through the first and the second links.

2. The actuation system of claim 1, wherein
the first link includes a first spherical bearing and a second spherical bearing; and
the first link extends along the first centerline between the first spherical bearing and the second spherical bearing.

3. The actuation system of claim 2, further comprising a pair of mounting tabs projecting out from the component, the first spherical bearing laterally between and attached to the mounting tabs.

4. The actuation system of claim 2, further comprising an actuator mount pivotally attached to the linear actuator, the actuator mount including a pair of mounting tabs, and the second spherical bearing laterally between and attached to the mounting tabs.

5. The actuation system of claim 4, further comprising a pair of second mounting tabs projecting out from the component, the first spherical bearing laterally between and attached to the second mounting tabs.

6. The actuation system of claim 2, wherein the first spherical bearing has a first axis, the second spherical bearing has a second axis, and the first axis is perpendicular to the second axis.

7. The actuation system of claim 6, wherein the first axis and the second axis are perpendicular to the actuation axis.

8. The actuation system of claim 1, further comprising:
an actuator mount including a. mount base, a first mount and a second mount, the mount base extending circumferentially about and pivotally coupled to the linear actuator, the first mount on the first side and projecting radially out from the mount base, and the second mount on the second side and projecting radially out from the mount base;
a first spherical bearing coupling the first mount with the first link; and
a second spherical bearing coupling the second mount with the second link.

9. The actuation system of claim 8, further comprising:
a third mount connected to the component;
a fourth mount connected to the component;
a third spherical bearing coupling the third mount with the first link; and
a fourth spherical bearing coupling the fourth mount with the second link.

10. The actuation system of claim 9, wherein the first centerline extends through a centroid of the first spherical bearing and a centroid of the third spherical bearing.

11. The actuation system of claim 8, wherein the mount base is pivotally coupled to the linear actuator about a pivot axis perpendicular to the actuation axis.

12. The actuation system of claim 1, further comprising:
a first mount connected to the component;
a second mount connected to the component;
a first spherical bearing coupling the first mount with the first link; and
a second spherical bearing coupling the second mount with the second link.

13. The actuation system of claim 1, further comprising:
a third component;
the second component disposed axially between the component and the third component along the actuation axis;
the linear actuator including a second translatable element, the linear actuator configured to move the second translatable element relative to the actuator base; and
the second translatable element coupled to the third component.

14. The actuation system of claim 1, wherein the component is configured as a component of a nacelle system.

15. An actuation system, comprising:
a translatable component including a surface, a first mount and a second mount, the first mount projecting out from the surface, and the second mount projecting out from the surface;
a linear actuator extending longitudinally along an actuation axis that is substantially parallel with the surface;
an actuator mount coupled to the linear actuator;
a first link on a first side of the linear actuator, wherein the first link is coupled to the actuator mount through a first spherical bearing, and the first link is coupled to the first mount through a second spherical bearing; and
a second link on a second side of the linear actuator laterally opposite the first side, wherein the second link is coupled to the actuator mount through a third spherical bearing, and the second link is coupled to the second mount through a fourth spherical bearing.

16. The actuation system of claim 15, wherein.
a first straight-line trajectory extends through a centroid of the first spherical bearing and a centroid of the second spherical bearing, and is parallel to the actuation axis; and
a second straight-line trajectory extends through a centroid of the third spherical bearing and a centroid of the fourth spherical bearing, and is parallel to the actuation axis.

17. The actuation system of claim 15, further comprising:
a second component;
the linear actuator including an actuator base and a translatable element, and the linear actuator configured to move the translatable element relative to the actuator base;
the actuator base coupled to the second component; and
the translatable element coupled to the translatable component through the first link and the second link.

18. An actuation system, comprising:
a translatable component including a surface, a first mount and a second mount, the first mount projecting our from the surface, and the second mount projecting out from the surface;
a linear actuator extending longitudinally along an actuation axis besides the surface;
an actuator mount pivotally coupled to the linear actuator about a first pivot axis perpendicular to the actuation axis;
a first link on a first side of the linear actuator, the first link between and interconnecting the actuator mount and the first mount, wherein the first link is pivotally coupled to the actuator mount about a second pivot axis parallel with the first pivot axis; and
a second link on a second side of the linear actuator laterally opposite the second side, the second link between and interconnecting the actuator mount and the second mount, wherein the second link is pivotally coupled to the actuator mount about a third pivot axis parallel with the first pivot axis.

19. The actuation system of claim 18, wherein
the first link is pivotally coupled to the first mount about a fourth pivot axis perpendicular to the first pivot axis and the actuation axis; and
the second link is pivotally coupled to the second mount about a fifth pivot axis co-axial with the fourth pivot axis.

20. The actuation system of claim 18, further comprising:
a second component;

the linear actuator including an actuator base and a translatable element, and the linear actuator configured to move the translatable element relative to the actuator base;

the actuator base coupled to the second component; and the translatable element coupled to the translatable component through the first link and the second link.

* * * * *

UNITED STATES PATENT AND TRADEMARK OFFICE
CERTIFICATE OF CORRECTION

PATENT NO. : 9,976,696 B2
APPLICATION NO. : 15/188565
DATED : May 22, 2018
INVENTOR(S) : Timothy Gormley It is certified that error appears in the above-identified patent and that said Letters Patent is hereby corrected as shown below:

In the Specification

Column 5, Line 52, please delete "faun" and insert --form--.

In the Claims

Column 7, Line 22, please delete "a." and insert --a--.

Column 8, Line 41, please delete "our" and insert --out--.

Signed and Sealed this
Twenty-sixth Day of June, 2018

Andrei Iancu
*Director of the United States Patent and Trademark Office*